US008578028B2

(12) United States Patent
Grigsby et al.

(10) Patent No.: US 8,578,028 B2
(45) Date of Patent: Nov. 5, 2013

(54) TECHNIQUES FOR PROVISIONING CLOUD COMPUTING ENVIRONMENT RESOURCES BASED ON SOCIAL MEDIA ANALYSIS

(75) Inventors: Travis M. Grigsby, Austin, TX (US); Pamela A. Nesbitt, Ridgefield, CT (US); Michael A. Paolini, Austin, TX (US); Cristi N. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/985,721

(22) Filed: Jan. 6, 2011

(65) Prior Publication Data
US 2012/0179822 A1 Jul. 12, 2012

(51) Int. Cl.
G06F 9/50 (2006.01)
G06F 15/16 (2006.01)
G06F 15/173 (2006.01)
G06F 15/177 (2006.01)

(52) U.S. Cl.
USPC .......... 709/226; 709/201; 709/223; 709/224; 709/225

(58) Field of Classification Search
USPC ........................................ 709/201, 223–226
See application file for complete search history.

(56) References Cited

U.S. PATENT DOCUMENTS

| 6,374,297 | B1 | 4/2002 | Wolf et al. |
| 6,947,378 | B2 | 9/2005 | Wu et al. |
| 7,386,611 | B2 | 6/2008 | Dias et al. |
| 7,565,399 | B1* | 7/2009 | Goel ............................. 709/203 |
| 7,580,349 | B1 | 8/2009 | Wang et al. |
| 2002/0161767 | A1 | 10/2002 | Shapiro et al. |
| 2004/0143672 | A1 | 7/2004 | Padmanabham et al. |
| 2005/0154768 | A1* | 7/2005 | Theimer et al. ............... 707/200 |
| 2008/0243993 | A1* | 10/2008 | Wang et al. .................. 709/203 |
| 2008/0288596 | A1 | 11/2008 | Smith et al. |
| 2009/0037421 | A1* | 2/2009 | Gamble ......................... 707/10 |
| 2009/0183218 | A1 | 7/2009 | Li et al. |
| 2009/0265473 | A1 | 10/2009 | Hydrie et al. |
| 2009/0279562 | A1 | 11/2009 | Wang et al. |

FOREIGN PATENT DOCUMENTS

GB 2458803 A 10/2009

* cited by examiner

*Primary Examiner* — Beemnet Dada
*Assistant Examiner* — Kalish Bell
(74) *Attorney, Agent, or Firm* — Yudell Isidore Ng Russell PLLC

(57) ABSTRACT

A technique for provisioning computing environment resources based on social media analysis includes monitoring, using a data processing system, references (e.g., hyperlinks) provided by a first website to detect an anticipated flash crowd for a web-accessible resource (e.g., second website). The technique also includes generating, using the data processing system, a notice to allocate resources associated with the web-accessible resource to service the anticipated flash crowd.

16 Claims, 5 Drawing Sheets

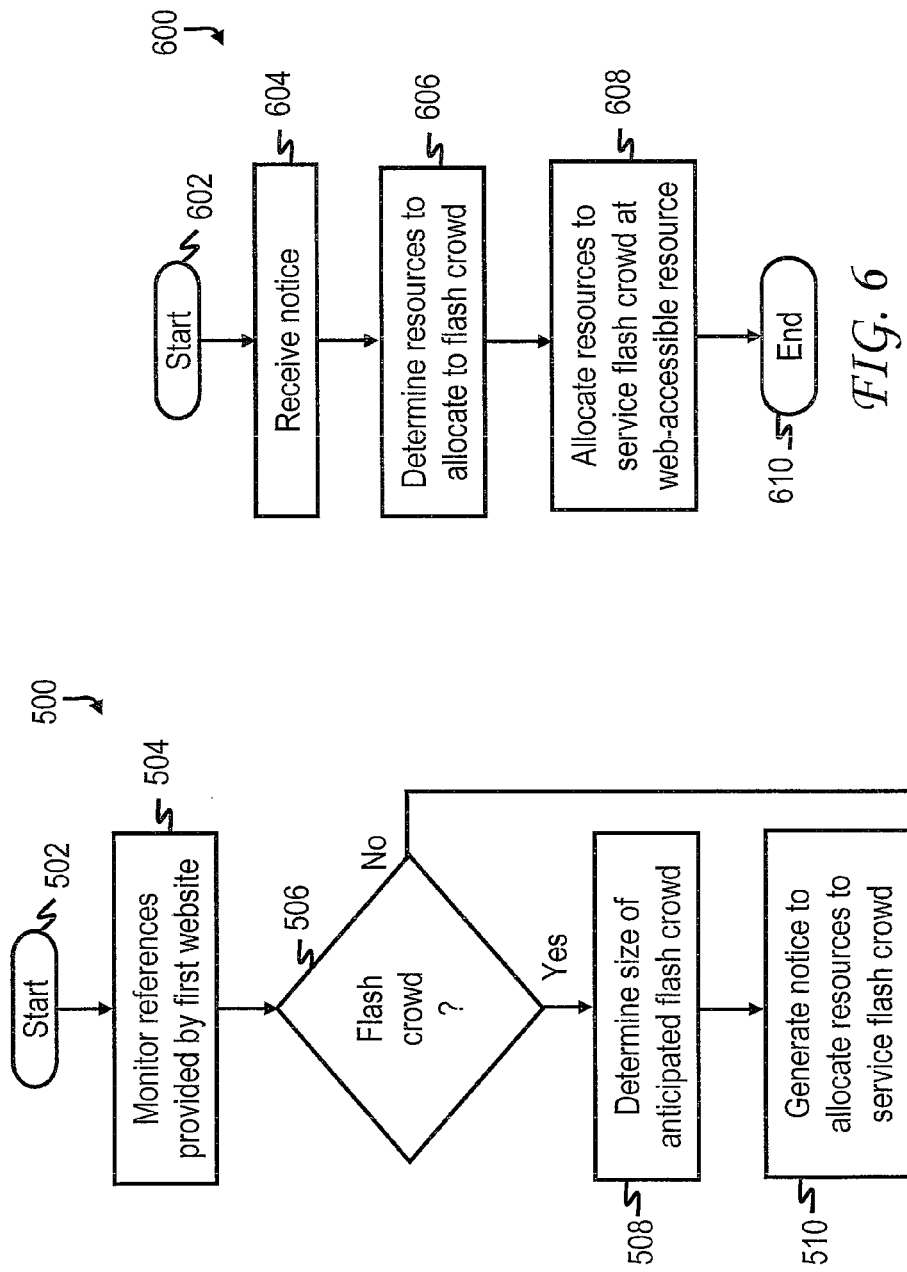

TECHNIQUES FOR PROVISIONING CLOUD COMPUTING ENVIRONMENT RESOURCES BASED ON SOCIAL MEDIA ANALYSIS

BACKGROUND

1. Technical Field

The present invention generally relates to provisioning computing environment resources based on social media analysis and in particular to techniques for provisioning cloud computing environment resources based on social media analysis.

2. Description of the Related Art

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread adoption of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like the physical machine. VMs are usually categorized as system VMs or process VMs. A system VM provides a complete system platform that supports the execution of a complete operating system (OS). In contrast, a process VM is usually designed to run a single program and support a single process. A characteristic of a VM is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (via the Internet) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

A "flash crowd" is a term used for are very large group of individuals that access a particular website simultaneously in response to an event (e.g., an entry on a social news website such as Digg™ or Slashdot™). In an extreme case, a flash crowd may cause one or more web servers to go down (sometimes referred to as the Digg effect or Slashdot effect depending on the referring website) and may cause other negative effects to a network around the web servers. Conventionally, flash crowds have forced web content creators to either allocate bandwidth (e.g., in the form of additional web servers) that is not utilized the vast majority of the time, or accept that when a flash crowd accesses content on a website allocated web servers will not be able to handle the additional traffic caused by the flash crowd. In general, dynamic scalability and provisioning available with cloud computing helps address the issue of flash crowds (among others). Unfortunately, dynamic provisioning of additional instances in a conventional cloud computing environment is entirely reactive and takes a non-trivial amount of time.

BRIEF SUMMARY

Disclosed are a method, a data processing system, and a computer program product (embodied in a computer-readable storage medium) for provisioning cloud computing environment resources based on social media analysis.

A technique for provisioning cloud computing environment resources based on social media analysis includes monitoring, using a data processing system, references (e.g., hyperlinks) provided by a first website to detect an anticipated flash crowd for a web-accessible resource (e.g., a second website). The technique also includes generating, using the data processing system, a notice to allocate resources associated with the web-accessible resource to service the anticipated flash crowd.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 5 is a flow chart for an exemplary process that implements techniques for provisioning cloud computing environment resources based on social media analysis according to various embodiments of the present disclosure; and FIG. 6 is a flow chart for an exemplary process that implements techniques for provisioning cloud computing environment resources based on social media analysis according to other various embodiments of the present disclosure.

DETAILED DESCRIPTION

Figure 1:
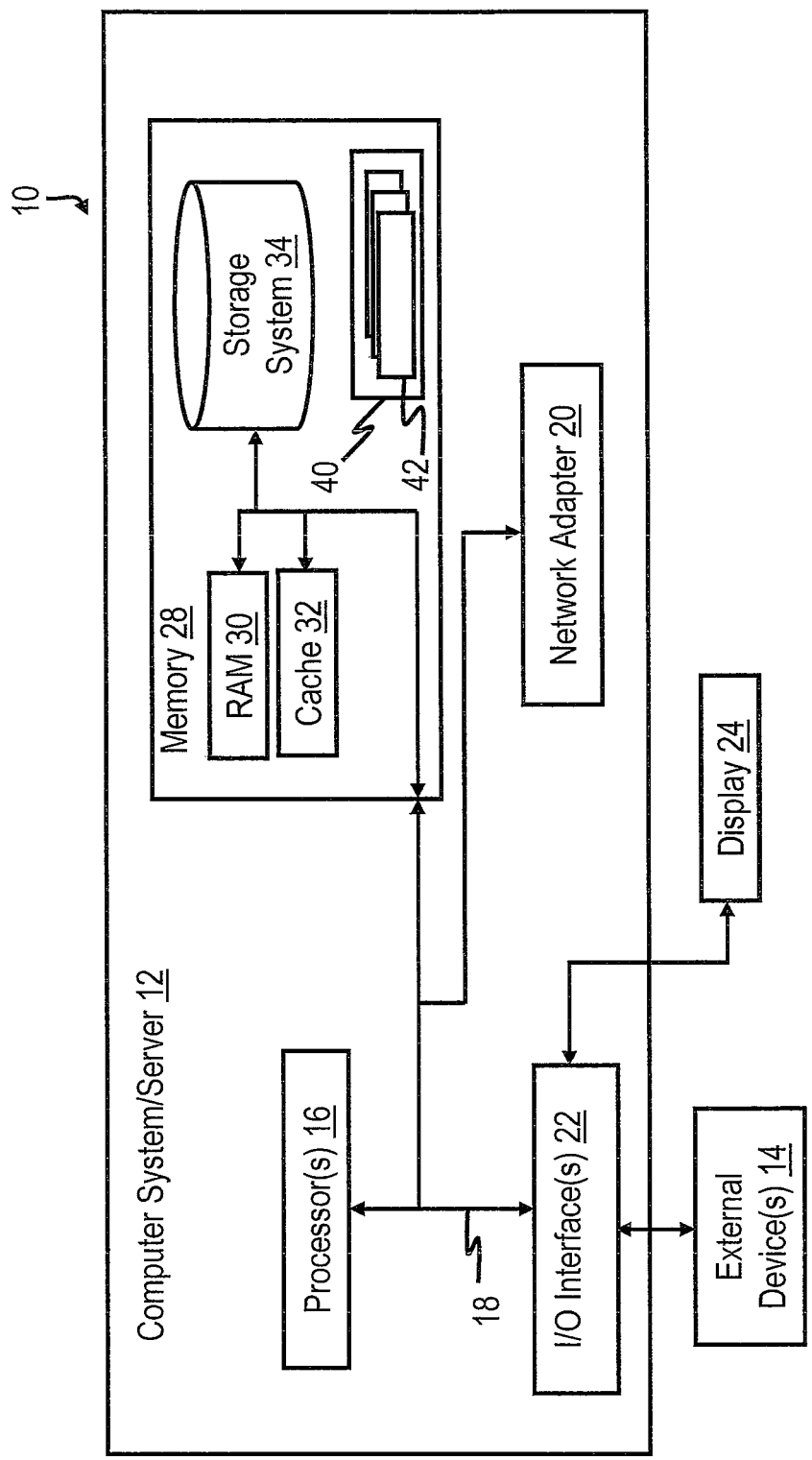
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for provisioning cloud computing environment resources based on social media analysis.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

While conventional cloud computing solutions use thresholds to bring additional servers on-line to service workloads, flash crowds are not linear in ramp-up (i.e., traffic associated with flash crowds increases exponentially) and, as such, do not usually allow enough time to bring additional servers on-line to adequately service the flash crowd. For example, in a conventional cloud computing environment, minutes of webpage load time may be lost to dynamic provisioning while a flash crowd is attempting to concurrently access an application (web application). As alluded to above, while there are times when it is possible to accurately predict that more instances of an application will be needed, current cloud computing solutions are not capable of anticipating flash crowds.

According to one aspect of the present disclosure, a monitoring agent (executing on a data processing system) is implemented to monitor selected websites (in order to anticipate a flash crowd) and create anticipatory cloud resource instances in order to service the flash crowd. Alternatively, the monitoring agent (upon detecting an anticipated flash crowd) may be configured to notify (e.g., via an application programming interface (API) call) a cloud server that owns a resource that additional resource instances should be brought on-line. For example, the monitoring agent may be configured to notify a cloud server that owns an application and/or data set when the person/group/company that owns the monitoring agent does not also own the application and/or data set that the flash crowd is about to access.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed, including client-server and peer-to-peer computing environments. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
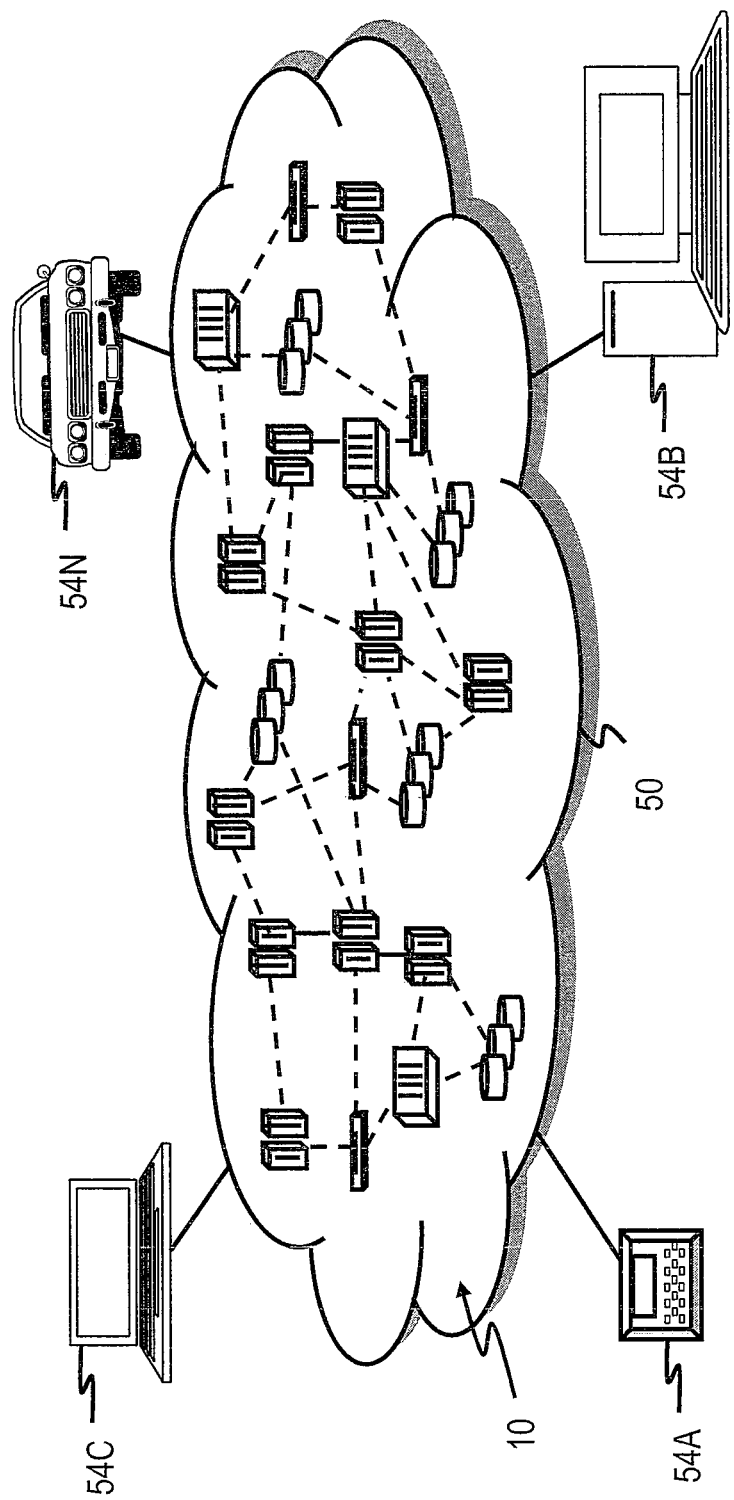
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
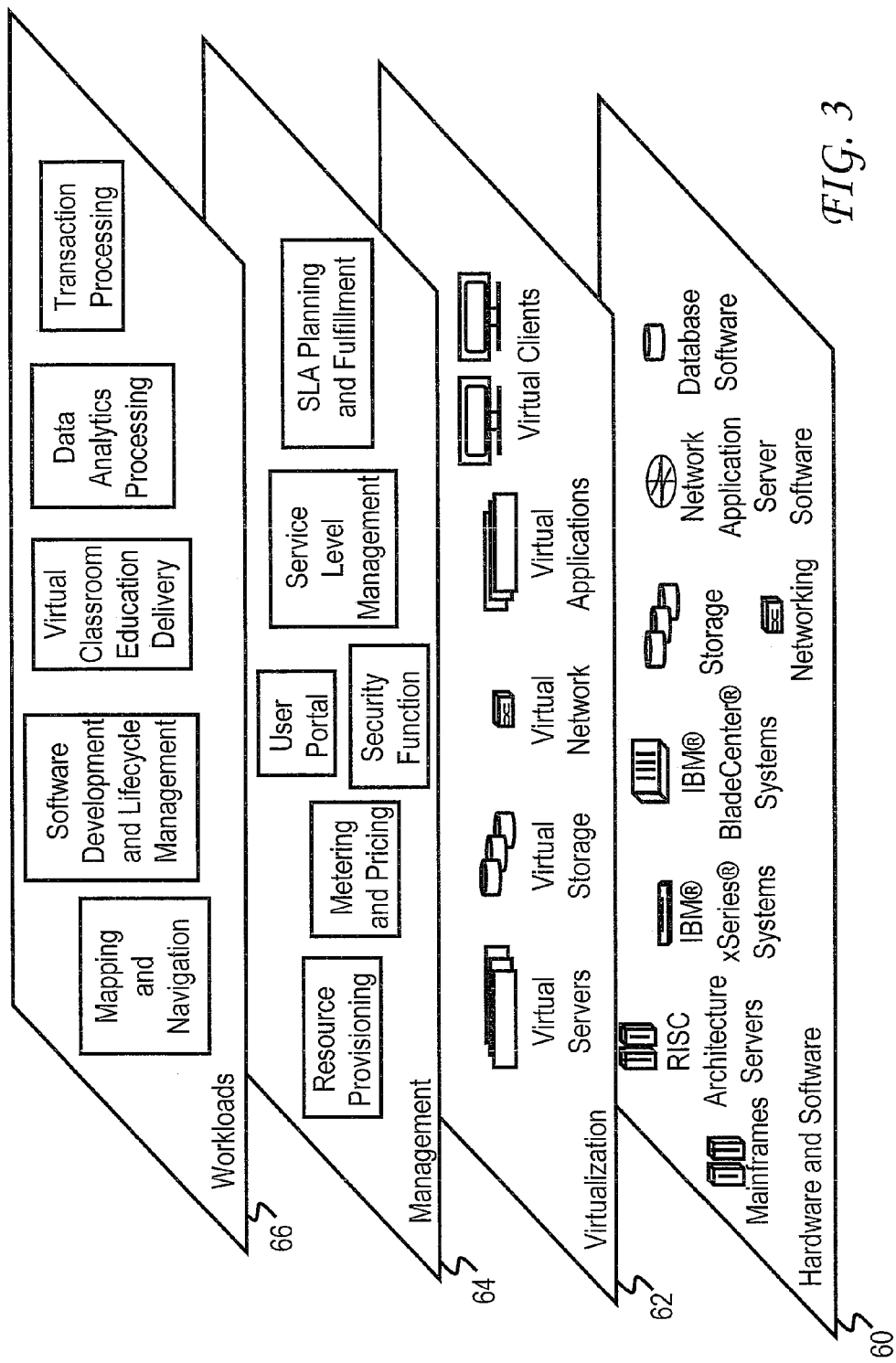
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM pSeries® systems), IBM xSeries® systems, IBM BladeCenter® systems, storage devices, networks and networking components. As another example, the software components may include network application server software (e.g., IBM WebSphere® application server software) and database software (e.g., IBM DB2®, database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

According to one aspect of the present disclosure, a monitoring agent for a web-accessible resource (e.g., a first website) is configured to monitor a second website (e.g., a front page atom feed of Digg™). In one or more embodiments, when a reference (e.g., hyperlink) for the first website hits the front page of the second website, the monitoring agent creates additional resource instances associated with the first website or notifies a provisioning manager for the first website to create additional resource instances (e.g., website instances, web server instances, etc.) in anticipation of a flash crowd. The monitoring agent and the provisioning manager may be, for example, implemented in hardware and software layer 60, virtualization layer 62, or management layer 64 of cloud computing environment 50. The provisioning manager may, for example, take the form of a virtual machine monitor (VMM).

A monitoring agent may monitor various types of websites to anticipate flash crowds. For example, a monitoring agent may monitor social news websites, news websites, news articles, blogs, Twitter™, and/or social networking websites. As an example for a social news website, a monitoring agent may monitor: only a front page of the social news website; a recent twenty-four hours of the social news website; or multiple social news websites simultaneously. In one or more embodiments, a monitoring agent may employ a popularity threshold (e.g., the number of votes on Digg™, Reddit™, or Karma™, and/or hyperlinks higher in a webpage) to predict a flash crowd. For news websites and news articles, a monitoring agent may, for example, only monitor a front page or hyperlinks higher in an article may be assigned a higher likelihood of a flash crowd.

For social networking websites, monitoring may be limited to profiles of more popular people (e.g., celebrities, professional athletes, movie stars, etc). A monitoring agent may scan for hyperlinks that pertain to, for example, a domain, a particular website or webpage in a domain (e.g., a particular individual's blog), and/or a piece of content at a particular website (e.g., a specific Youtube™ video and/or a Flickr™ stream of a particular video). When a flash crowd is anticipated, additional instances of the web server, the particular application, the piece of content, and/or related content (e.g., things linked to/from the piece of content and articles (e.g., Wikipedia™ articles) on terms in the piece of content) may be created in a manner that is easier for the flash crowd to consume (e.g., content may be provided at a geographical location that is physically closer to the anticipated flash crowd participants).

For example, a time of day and a geographical location of data center servers, geographical origin of an item and the location of the item, and a subject matter and language of an item may be used as factors in determining resources required to service an anticipated flash crowd. As one example, based on a time of day and a geographical location of data center servers additional application instances may be spun-up in the United States between noon and 8:00 p.m. and fewer applications instance may be spun-up in the Asia-Pacific region during the same time period. As another example, historical data from similar subjects and items, and the number of views for those items may be employed in determining resources required to service an anticipated flash crowd. For example, if a post on Digg™ is for a movie sequel, historical numbers for a previous movie in the sequel can be reviewed to provide an indication of resources that may be required to service an anticipated flash crowd. If a movie also includes one or more famous cast members, items with the famous cast members can be reviewed and taken into account.

As another example, Zeitgeist items (i.e., items that provide the general cultural, intellectual, ethical, spiritual, and/or political climate within a nation or specific groups, along with the general ambience, morals, socio-cultural direction, and mood associated with an era), and Internet memes (i.e., concepts that spread via the Internet) may be utilized to predict resources required to service an anticipated flash crowd. For example, if a website (e.g., Digg™) maintains a subscription to the top 1000 or so searches for the last week, items falling into similar categories or of that subject may require additional resources. In general, whatever is trendy (e.g., 'rickrolling' and 'lolcat') is more likely to require more application instances. As is known, 'rickrolling' refers to an Internet meme that provides a hyperlink that is not relevant to a represented subject. As is also known, 'lolcat' refers to a photograph of a cat with text intended to contribute humor.

Web feeds (e.g., really simple syndication (RSS) feeds) from other news sources may be considered when provisioning resources. A staleness threshold may be employed to reduce the number of resources allocated for a flash crowd or to determine when a hyperlink, while present on a monitored webpage, is not indicative of a flash crowd. For example, if a similar subject appears on a competing feed (e.g., hours before), then fewer additional application instances (or zero additional application instances) would usually need to be deployed to service a flash crowd as the story or item is old news. The number of mentions of a topic on numerous websites and a correlation of their relative importance may also be utilized as a filter to determine the need for additional application instances. It should be appreciated that similar logic may be applied to predicatively ramp-down application instances as the popularity of a hyperlink declines.

Figure 4:
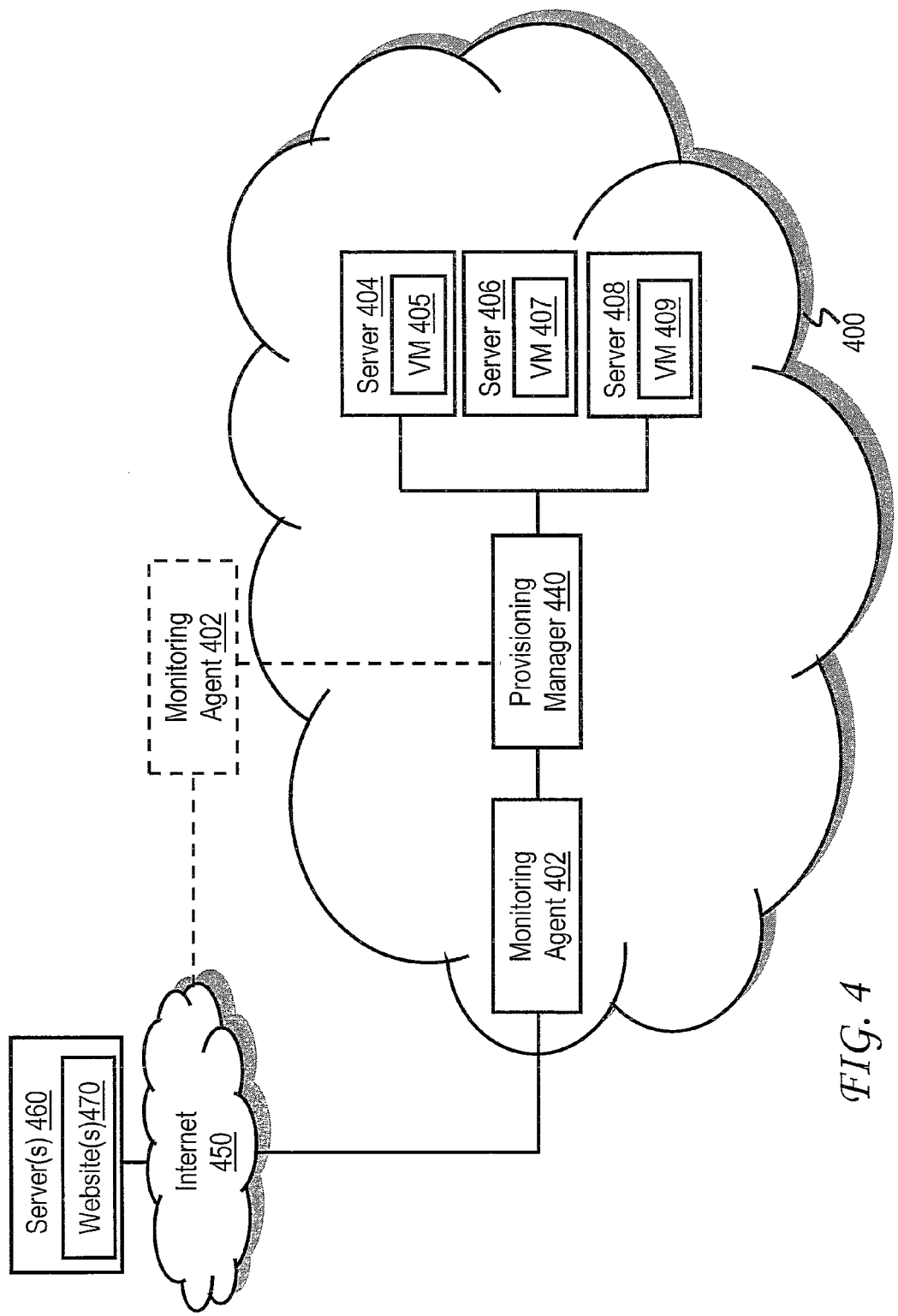
FIG. 4 is a diagram of a relevant portion of an exemplary cloud computing environment that includes a monitoring agent (executing on a data processing system) configured in accordance with various embodiments of the present disclosure to provision cloud computing environment resources based on social media analysis.

With reference to FIG. 4, an exemplary cloud computing environment 400 includes a monitoring agent 402 (executing on a data processing system) that is in communication with one or more monitored websites 470 that are hosted by one or more servers 460 that are accessible via Internet 450. It should be appreciated that monitoring agent 402 may monitor websites hosted inside of cloud computing environment 400 and/or websites hosted outside of cloud computing environment 400. In an alternative embodiment, monitoring agent 402 is located outside of cloud computing environment 400. Irrespective of whether monitoring agent 402 is located inside or outside of cloud computing environment 400, monitoring agent 402 is in communication (e.g., via provisioning manager 440) with servers 404, 406, and 408 located within cloud computing environment 400. As is illustrated, servers 404, 406, and 408 execute virtual machines (VMs) 405, 407, and 409, respectively. In one or more embodiments, VMs 405, 407, and 409 are configured to host one or more websites or other web-accessible resource (e.g., a file transfer protocol (FTP) site) for which monitoring agent 402 monitors one or more other websites.

While only three servers 404, 406, and 408 are illustrated in cloud computing environment 400, it should be appreciated that more or less than three servers may be implemented within a cloud computing environment configured according to the present disclosure. Moreover, while servers 404, 406, and 408 are illustrated as only executing a single VM, servers 404, 406, and 408 may host one or more VMs. In various embodiments, monitoring agent 402, provisioning manager 440, and servers 404, 406, and 408 execute on data processing system that may be configured in a similar manner as computer system/server 12 of FIG. 1. Servers 404, 406, and 408 may be in different geographical locations (e.g., different states (e.g., Texas, Missouri, and Michigan) within the United States or different countries (e.g., Canada, Mexico, and the United States)) or a same geographical location (e.g., within a same building or within different buildings in a same city). Similarly, monitoring agent 402 and provisioning manager 440 may be deployed in a same geographical location as servers 404, 406, and 408 or in a different geographical location.

In one or more embodiments, monitoring agent 402 is configured to monitor hyperlinks provided by a first website (e.g., website(s) 470 on server(s) 460) to detect an anticipated flash crowd for a second website that is hosted by a server (e.g., a website hosted by VM 405 on server 404) in cloud computing environment 400. For example, hyperlinks may be provided in one or more feeds provided by the first website. It should be appreciated that monitoring agent 402 may be configured to monitor multiple websites simultaneously. Monitoring agent 402 may, for example, monitor one or more social news websites, news websites, news articles, blogs, Twitter™, and/or social networking websites to detect an anticipated flash crowd for the second website. Monitoring agent 402 may employ a popularity threshold to determine when one of the hyperlinks is indicative of an anticipated flash crowd for the second website. Monitoring agent 402 may also employ a staleness threshold to determine when one of the hyperlinks is not indicative of an anticipated flash crowd for the second website or when fewer VM image instances need to be deployed to service the anticipated flash crowd.

Monitoring agent 402 is also configured to initiate allocation of resources associated with the second website to service the anticipated flash crowd. As one example, when a hyperlink for the second website hits the front page of the first website, monitoring agent 402 may initiate creation of additional resources for the second website or notify provisioning manager 440 (e.g., implemented on the same or a different data processing system as monitoring agent 402 inside or outside cloud computing environment 400) for the second website to create additional resources in anticipation of a flash crowd. For example, the additional resources may correspond to additional application instances, additional web server instances, additional load balancing servers, additional content instances, and/or additional related content instances. As one example, the first website may be hosted by a server accessible via Internet 450 and the second website may be hosted by one or more of servers 404, 406, and 408.

With reference to FIG. 5, a flow chart for an exemplary computing environment resource provisioning process 500 (for addressing flash crowds in a cloud computing environment according to various embodiments of the present disclosure) is illustrated. For ease of understanding, process 500 is described in conjunction with cloud computing environment 400 of FIG. 4. In various embodiments, process 500 is implemented by monitoring agent 402, which may execute on a data processing system that is located inside or outside of cloud computing environment 400. Process 500 begins (e.g., in response to a request by a cloud consumer for monitoring services) at block 502, at which point control transfers to block 504. In block 504, monitoring agent 402 initiates monitoring references (e.g., hyperlinks) provided by a first website to detect an anticipated flash crowd for a web-accessible resource (e.g., a second website). That is, monitoring agent 402 monitors references (e.g., hyperlinks) provided by the first website for a reference (e.g., hyperlink) that is associated with the web-accessible resource (e.g., the second website). While process 500 is discussed in conjunction with monitoring a single website, it should be appreciated that the disclosed techniques are applicable to monitoring multiple websites.

Next, in decision block 506, monitoring agent 402 determines whether a flash crowd is indicated. Monitoring agent 402 may employ a popularity threshold (e.g., number of votes on Digg™, Reddit™, or Karma™, and/or hyperlinks higher in a webpage) to predict (detect) a flash crowd. In this case, when votes for hyperlinks of the second webpage exceed the popularity threshold, monitoring agent 402 anticipates the occurrence of a flash crowd for the second webpage. For news websites and news articles, monitoring agent 402 may only monitor a front page or hyperlinks higher in an article may be assigned a higher likelihood of a flash crowd. A staleness threshold may also be employed (alone or in combination with the popularity threshold) to reduce the number of resources allocated for a flash crowd or to determine when a hyperlink (while present on a monitored webpage) is not indicative of a flash crowd. For example, if a similar subject appears on a competing feed (e.g., days before), then fewer application instances (or zero additional application instances) usually need to be deployed to service a flash crowd as the story or item is old news.

When a flash crowd is not indicated in block 506, control transfers to block 512 where process 500 ends and control returns to a calling process. When a flash crowd is indicated in block 506, control transfers to block 508. In block 508, monitoring agent 402 determines a size of an anticipated flash crowd and may determine the number of additional resources that should be allocated for the flash crowd. The allocated additional resources may correspond to, for example, additional application instances, additional web server instances, additional load balancing servers, additional content instances, and/or additional related content instances (e.g., deployed on one or more of servers 404, 406, and 408).

Next, in block 510, monitoring agent 402 generates a notice (to provisioning manager 440 which is responsible for allocating resources for a webpage) to allocate resources to service the anticipated flash crowd. The notice may include the number of additional resources to allocate, the size of an anticipated flash crowd, or both the number of additional resources to allocate and the size of an anticipated flash crowd. Provisioning manager 440 may allocate resources based on the recommendation provided by the monitoring agent 402 or may determine how many resources to allocate based on the size of the anticipated flash crowd or other factors.

The provisioning manager function may be implemented within monitoring agent 402 or within a server that hosts the webpage for which the monitoring agent 402 monitors one or more webpages (or by another component, e.g., a VMM (not shown), in cloud computing environment 400). For example, when a flash crowd of five thousand is anticipated, three additional webpage application instances may be recommended/allocated. As another example, when a flash crowd of ten thousand is anticipated, six additional webpage application instances may be recommended/allocated. In one or more embodiments, monitoring agent 402 (or another agent) is configured to initiate de-allocation of the additional resources following a decrease in or termination of the flash crowd at the second website. Following block 510, control transfers to block 512 where process 500 ends and control returns to a calling process, as noted above.

With reference to FIG. 6, a flow chart for an exemplary computing environment resource provisioning process 600 (for addressing flash crowds in a cloud computing environment according to various embodiments of the present disclosure) is illustrated. For ease of understanding, process 600 is described in conjunction with cloud computing environment 400 of FIG. 4. In various embodiments, process 600 is implemented within provisioning manager 440, which may execute on a data processing system that is located inside or outside of cloud computing environment 400. Process 600 begins (e.g., in response to a monitoring service request) at block 602, at which point control transfers to block 604. In block 604, provisioning manager 440 receives a notice (from monitoring agent 402) that a flash crowd is anticipated for a web-accessible resource (e.g., website) for which provisioning manager 440 allocates resources. The notice may include a size of an anticipated flash crowd and/or a number of additional resources that should be allocated for the flash crowd. As noted above, the allocated additional resources may correspond to, for example, additional application instances, additional web server instances, additional content instances, and/or additional related content instances.

Next, in block 606, provisioning manager 440 determines the number of additional resources to allocate for the anticipated flash crowd. The provisioning manager may allocate resources based on the recommendation provided by the monitoring agent 402 or may determine how many resources to allocate based on the size of the anticipated flash crowd or other factors disclosed herein. As noted above, the provisioning manager function may be implemented within monitoring agent 402 or within a server that hosts the webpage for which the monitoring agent 402 monitors one or more webpages (or by another component in cloud computing environment 400). As one example, when a flash crowd of two thousand is anticipated and three more webpage application instances are recommended by monitoring agent 402, provisioning agent 440 may decide to deploy four additional webpage application instances, instead of the recommended three additional webpage application instances. As another example, when a flash crowd of twenty thousand is anticipated and six additional webpage application instances are recommended by monitoring agent 402, provisioning agent 440 may decide to follow the recommendation and deploy six additional webpage application instances. Next, in block 608, provisioning manager 440 allocates resources to service the anticipated flash crowd. Following block 608, control transfers to block 610 where process 600 ends and control returns to a calling process.

In the flow chart above, the method depicted in FIGS. 5 and 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for provisioning computing environment resources based on social media analysis, comprising:
    monitoring, using a data processing system, references provided by a first website to detect an anticipated flash crowd for a web-accessible resource, wherein at least one of the references is employed to determine one or more Internet memes;
    determining, using the data processing system, whether one of the references is indicative of the anticipated flash crowd for the web-accessible resource, wherein a popularity threshold is employed to determine when one of the references is indicative of the anticipated flash crowd for the web-accessible resource and a staleness threshold is employed to determine when one of the references is not indicative of the anticipated flash crowd for the web-accessible resource;
    generating, using the data processing system, a first notice to allocate resources associated with the web-accessible resource to service the anticipated flash crowd based on the determining and the one or more Internet memes; and
    generating, using the data processing system, a second notice to de-allocate the resources associated with the web-accessible resource following termination of the anticipated flash crowd based on the determining and the one or more Internet memes.

2. The method of claim 1, wherein the computing environment is a cloud computing environment, the references are hyperlinks, the web-accessible resource is a second website, and the generating further includes:
    communicating, using the data processing system, with a server in the cloud computing environment that is responsible for the second website, how many additional application instances need to be brought on-line to service the anticipated flash crowd.

3. The method of claim 2, wherein the communicating is via an application programming interface (API) call.

4. The method of claim 1, wherein the resources correspond to additional application instances, additional web server instances, additional content instances, or additional related content instances.

5. The method of claim 1, wherein at least one of the references is included in a web feed available via the first website.

6. The method of claim 1, wherein the first website is a social news website, a news website, a news article, a web log, or a social networking website.

7. A computer program product for provisioning computing environment resources based on social media analysis, the computer program product comprising:
    a computer-readable storage device having computer-readable program code embodied thereon, wherein the computer-readable program code, when executed by a data processing system, causes the data processing system to:
        monitor references provided by a first website to detect an anticipated flash crowd for a web-accessible resource, wherein at least one of the references is employed to determine one or more Internet memes;
        determine whether one of the references is indicative of the anticipated flash crowd for the web-accessible resource, wherein a popularity threshold is employed to determine when one of the references is indicative of the anticipated flash crowd for the web-accessible resource and a staleness threshold is employed to determine when one of the references is not indicative of the anticipated flash crowd for the web-accessible resource;
        generate a first notice to allocate resources associated with the web-accessible resource to service the anticipated flash crowd based on the determining and the one or more Internet memes; and,
        generate a second notice to de-allocate the resources associated with the web-accessible resource following termination of the anticipated flash crowd based on the determining and the one or more Internet memes.

8. The computer program product of claim 7, wherein the computing environment is a cloud computing environment, the references are hyperlinks, the web-accessible resource is a second website, and the computer-readable program code, when executed by the data processing system, further causes the data processing system to:
    communicate to a server in the cloud computing environment that is responsible for the second website how many additional application instances need to be brought on-line to service the anticipated flash crowd.

9. The computer program product of claim 8, wherein the data processing system communicates with the server via an application programming interface (API) call.

10. The computer program product of claim 7, wherein the resources correspond to additional application instances, additional web server instances, additional content instances, or additional related content instances.

11. The computer program product of claim 7, wherein at least one of the references is included in a web feed available via the first website.

12. The computer program product of claim 7, wherein the first website is a social news website, a news website, a news article, a web log, or a social networking website.

13. A data processing system, comprising:

a memory; and a processor core coupled to the memory, wherein the processor core is configured to:

monitor references provided by a first website to detect an anticipated flash crowd for a web-accessible resource, wherein at least one of the references is employed to determine one or more Internet memes;

determine whether one of the references is indicative of the anticipated flash crowd for the web-accessible resource, wherein a popularity threshold is employed to determine when one of the references is indicative of the anticipated flash crowd for the web-accessible resource and a staleness threshold is employed to determine when one of the references is not indicative of the anticipated flash crowd for the web-accessible resource;

generate a first notice to allocate resources associated with the web-accessible resource to service the anticipated flash crowd based on the determining and the one or more Internet memes; and generate a second notice to de-allocate the resources associated with the web-accessible resource following termination of the anticipated flash crowd based on the determining and the one or more Internet memes.

14. The data processing system of claim 13, wherein the references are hyperlinks, the web-accessible resource is a second website, and the wherein the processor core is further configured to:

communicate to a server in the cloud computing environment that is responsible for the second website how many additional application instances need to be brought on-line to service the anticipated flash crowd.

15. The data processing system of claim 13, wherein the resources correspond to additional application instances, additional web server instances, additional content instances, or additional related content instances.

16. The data processing system of claim 13, wherein at least one of the references is included in a web feed available via the first website.

\* \* \* \* \*